United States Patent [19]

Eklund et al.

[11] Patent Number: 5,684,066
[45] Date of Patent: Nov. 4, 1997

[54] PROTECTIVE COATINGS HAVING ENHANCED PROPERTIES

[75] Inventors: Wayne G. Eklund, Scandia, Minn.; Stephen C. Hart, Hudson, Wis.

[73] Assignee: H.B. Fuller Licensing & Financing, Inc., St. Paul, Minn.

[21] Appl. No.: 751,599

[22] Filed: Nov. 18, 1996

Related U.S. Application Data

[63] Continuation-in-part of Ser. No. 567,498, Dec. 4, 1995, abandoned.

[51] Int. Cl.[6] .................. C08K 3/10; C08L 83/06
[52] U.S. Cl. .................. 523/435; 523/466; 525/100; 525/103; 428/413; 428/418; 428/447
[58] Field of Search ..................... 525/103, 100; 523/435, 466; 428/418, 447

[56] References Cited

U.S. PATENT DOCUMENTS

| | | | |
|---|---|---|---|
| 4,107,148 | 8/1978 | Fujiyoshi et al. | 528/273 |
| 4,404,042 | 9/1983 | Okada et al. | 148/6.2 |
| 4,446,259 | 5/1984 | Vasta | 523/408 |
| 4,657,963 | 4/1987 | Matsumoto et al. | 524/400 |
| 4,746,568 | 5/1988 | Matsumoto et al. | 425/323 |
| 4,877,837 | 10/1989 | Reising et al. | 525/100 |
| 4,879,344 | 11/1989 | Woo et al. | 525/100 |
| 5,087,286 | 2/1992 | Fukuda et al. | 106/287.16 |
| 5,422,396 | 6/1995 | Daly et al. | 525/106 |

*Primary Examiner*—Ralph H. Dean
*Attorney, Agent, or Firm*—Carolyn A. Fischer; Nancy N. Quan

[57] ABSTRACT

The present invention discloses a method for the preparation of heat-resistant protective coatings wherein powder-based compositions are cured at temperatures greater than about 205° C. to form high-film-build coatings which are substantially free of coating defects.

16 Claims, No Drawings

PROTECTIVE COATINGS HAVING ENHANCED PROPERTIES

Cross-Reference To Related Application

This application is a Continuation-In-Part of application Ser. No. 08/567,498, filed Dec. 4, 1995, incorporated herein by reference, now abandoned.

FIELD OF THE INVENTION

The present invention relates to a thermoforming heat-resistant powder coating composition. Specifically, the present composition provides a coating that can be applied at high-film-build to articles. More specifically, it relates to a method wherein powder-based compositions are applied at a high-film-build and cured at temperatures greater than about 205° C. to form protective coatings which are substantially free of coating defects.

BACKGROUND OF THE INVENTION

Powder coating compositions are well known and established art. A variety of articles are routinely powder coated by dipping, or rambling them in a suspended or static bed of resinous powder coating or by spray or sprinkling. The article on which the coating is applied is then heated to form a cured powder coating. These coatings have been shown to be particularly useful on metal surfaces including steel, aluminum and iron.

Various powder coating compositions are available that have been used in heat-resistant applications. For example, it is known in the art that aromatic epoxy resins are used to provide good heat resistance. Epoxy compositions or epoxy and silicone mixtures have also been used in the industry for the same purpose. An example of a silicone coating composition is shown in U.S. Pat. No. 5,433,396 (Daly et al.). However, this composition, along with the other silicone based powder coating compositions, rely on the condensation of the silicone resin with another resin or itself to form the coating composition.

Additional references which describe the preparation of heat-resistant protective coatings are described below:

U.S. Pat. No. 4,877,837 (Reising et al.) discloses powder-based compositions comprising glycidyl functional acrylic polymers admixed with silicone having hydroxyl functional groups. The compositions may contain additives such as flow agents, outgas agents and filler pigments (i.e., hydrated silicates of aluminum and calcium metasilicate) and are cured at a temperature between 180° C.–200° C.).

U.S. Pat. No. 4,446,259 (Vasta) discloses coating compositions in a liquid carrier, which can be cured at ambient temperatures, comprising glycidyl functional acrylic polymers admixed with a reactive polysiloxane. The coatings may contain additives such as metal oxides, metallic pigments and trace amounts of muitivalent metal ions including tin and zinc. Vasta also discloses fluorocarbon-based powder compositions which are baked at 200° C.–345° C. for about 2 hours to provide a coating 25–75 microns thick.

Other related patents include: U.S. Pat. No. 4,404,042 (Okada et al.); U.S. Pat. Nos. 4,657,963 and 4,746,568 (Matsumoto et al.); U.S. Pat. No. 5,442,396 (Daly et al.); U.S. Pat. No. 4,879,344 (Woo et al.); and U.S. Pat. No. 5,087,286 (Fukuda et al.).

A drawback with the prior art references relates to the protective coatings appearance and protective nature when elevated temperatures are used to cure high-film-build powder-based compositions. For example, when said compositions are cured at elevated temperatures, condensation and thermal decomposition by-products often generate gases which can form pinholes, cracks and craters in the protective coating. These defects can be detrimental to coating properties including aesthetics, heat resistance and corrosion resistance and typically limit the coating thickness to less than about 100 microns.

To enhance the performance characteristics of protective coatings, it is often necessary to apply a high-film-build. A higher-film-build generally allows complete deposition of the powders on a substrate and once cured, it increases the protective coatings film thickness to provide an extra barrier of protection.

Therefore, there remains a need for heat-resistant protective coatings which are characterized as having a film thickness greater than about 100 microns and are substantially free of coating defects.

SUMMARY OF THE INVENTION

The invention provides a thermoforming heat-resistant powder coating composition for use on metal substrates including steel, aluminum, iron and the like. This composition further provides abrasion resistance and electrical resistance. It can be particularly useful for coating high temperature stacks, mufflers, manifolds, boilers, ovens, furnaces, steam lines, heat exchangers, barbecue equipment, cooking utensils and other parts that require a high heat resistance powder coating compositions.

The present invention is directed to heat resistant protective coatings which are formed from powder-based compositions comprising:
1) at least one glycidyl-functional polyacrylic polymer;
2) at least one hydroxyl-functional polysiloxane;
3) at least one inorganic compound; and
4) at least one flow control agent;

pwherein said composition is heated to a temperature greater than about 205° C. to form a continuous film having a thickness greater than about 100 microns.

Surprisingly, the inventive coatings have excellent heat resistant characteristics and pass the tape pull test method after about 500 hours at 340° C. Additionally, the coatings outperform existing products currently available for use as heat resistant protective coatings, It is surmised that some of these unique characteristics can be attributed to the specific inorganic compounds and the temperature at which the powder-based compositions are cured.

In another aspect, the invention discloses a method for the preparation of heat resistant protective coatings comprising the steps of:
1) providing a dry blend of powder-based materials comprising;
   a) at least one glycidyl-functional polyacrylate;
   b) at least one hydroxyl-functional polysiloxane;
   c) at least one inorganic compound; and
   d) at least one flow control agent;
2) melt mixing said blend and cooling to form solid particulate;
3) grinding said particulate to form a powder-based composition wherein said composition comprises an average particle size less than about 150 microns; and
4) coating said composition on a substrate and heating to a temperature greater than about 205° C.

DETAILED DESCRIPTION OF THE INVENTION

The protective coatings of the present invention are characterized as having increased heat resistance properties and are substantially free of coating defects when elevated film thicknesses are utilized. The coatings are particularly useful on articles which are subjected to elevated temperatures including stacks, mufflers, manifolds, boilers, ovens, furnaces, steam lines, heat exchangers, barbecue equipment and cooking utensils.

The glycidyl-functional polyacrylic polymers can be present in the powder-based compositions in a range from about 5.0% by weight to about 30.0% by weight, and preferably from about 10.0% by weight to about 20.0% by weight, based on the total composition solids. Examples of commercially available glycidyl-functional polyacrylic polymers include Fine-Clad™ A-244A from Reichold Chemicals, Inc. (Research Triangle Park, N.C.), and Almatex PD-7690 from Anderson Development Company (Adrain, Mich.). Said polymers may react with hydroxyl-functional compounds, through an addition mechanism, to form a crosslinked network.

Hydroxyl-functional polysiloxane can be present in the powder-based compositions in a range from about 20.0% by weight to about 50.0% by weight, and preferably from about 25.0% by weight to about 45.0% by weight, based on the total composition solids. Additionally, the polysiloxane can have hydroxyl-functionality in a range from about 1.0% by weight to about 10.0% by weight, and preferably from about 3.0% by weight to about 7.0% by weight, based on the total polysiloxane solids. The compositions may include hydroxyl-functional organo-siloxanes including dimethyl-based silicone polymers, diphenyl-based silicone polymers methyl-phenyl based silicone polymers and their mixtures. Examples of commercially available hydroxyl-functional polysiloxanes include Dow Corning® 1-0543, Dow Corning® 6-2230 and Dow Corning®Z-6018 from Dow Corning (Midland, Mich.); Wacker Silres® MK and Wacker Silres® SY-430 from Wacker Silicone Corp., (Adrien, Mich.); General Electric SR-355 from General Electric (Waterford, N.Y.); and PDS-9931 from Gelest, Inc., (Tullytown, Pa.). Other suitable silicone-based polymers include those described in U.S. Pat. No. 4,107,148 (Fujiyoshi et al.) and U.S. Pat. No. 4,879,344 (Woo et al.), incorporated herein by reference. Said polymers can self-condense and/or react with glycidyl functional polymers to form a crosslinked network.

Inorganic compounds can be present in the powder-based compositions in a range from about 10.0% by weight to about 70.0% by weight, and preferably from about 20.0% by weight to about 40.0% by weight, based on the total composition solids. The preferred inorganic compounds are hydrated silicates of aluminum (mica), calcium metasilicate (wollastonite) and their mixtures. Commercially available pigments include Micro Mica® C-3000 from KMG Minerals (King Mountain, N.C.) and Nyad® 325 from Nyco (Willsboro, N.Y.). It is surmised that the inventive coating unique heat resistant properties can be attributed, in-part, to said compounds. For example, it is known that inorganic compounds are often used as fillers to increase the coatings volume and economics. Surprisingly, the present inventors have now discovered that mica and wollastonite significantly increase the coating heat resistance properties. Inorganic fillers such as zinc oxide, zinc borate, barium sulfate, calcium sulfate, calcium carbonate, hydrated silicate of magnesium and anhydrous sodium potassium alumina silicate fail to increase the coatings heat resistance properties. It is further surmised that mica and wollastonite enhance the glycidyl-silanol addition reaction to form a substantially crosslinked network.

Flow control agents can be present in the powder-based compositions in a range from about 0.2% by weight to about 3.0% by weight, and preferably from about 0.5% by weight to about 1.5% by weight, based on the total composition solids. The flow control agents may include acrylics, silicones and fluorine-based polymers. Examples of commercially available flow control agents include Resiflow P-67™ and Clearflow Z-340™ from Estron Chemical, Inc. (Calvert City, Ky.); Mondaflow® 2000 from Monsanto (St. Louis, Mo.); Modarez® MFP from Synthron, Inc. (Morgantown, N.C.); and BYK® 361 from BYK Chemie (Wallingford, Conn.). Said agents enhance the compositions melt-flow characteristics and help eliminate surface defects.

The powder-based compositions may contain additives including adhesion promoters, degassing agents, catalysts, fillers, texturizers, coloring agents, plasticizers, surfactants and their mixtures.

If desired, adhesion promoters can be used in the powder-based compositions including epoxy-based polymers, silane-based polymers, phenolic resins, chlorinated polyolefins and their mixtures. Examples of commercially available adhesion promoters include Araldite® GT-7013 and Araldite® GT-7220 from Ciba-Geigy corporation (Hawthorn, N.Y.). The adhesion promoters may be present in a range from about 0.1% by weight to about 5.0% by weight, and preferably from about 1.5% by weight to about 3.0% by weight, based on the total composition solids.

Degassing agents can be used in the powder-based compositions and may be present in a range from about 0.1% by weight to about 5.0% by weight, and preferably from about 0.5% by weight to about 3.0% by weight, based on the total composition solids. Examples of a commercially available degassing agents include Uraflow B from GCA Chemical Corporation (Brandenton, Fla.), Oxymelt A-2™ from Estron Chemical (Calvert City, Ky.), and Benzoin from Generichem Corp. (Little Falls, N.J.). Said materials assist in the release of gases during the curing process.

Small quantities of catalysts may be used in the powder-based compositions which may include stannous octoate, dibutyl tin dilaurate, zinc octoate and their mixtures. Commercially available catalysts include Octallow ST-70™ from Estron Chemical, Inc., (Calvert City, Ky.); and Actiron DBT™ from Synthron (Morgantown, N.C.). The catalysts may be present in a range from about 0.01% by weight to about 5.0% by weight, and preferably from about 0.1% by weight to about 3.0% by weight, based on the total composition solids. The catalysts are used to enhance the curing characteristics of the powder-based compositions.

If desired, other inorganic fillers can be used in combination with the preferred inorganic compounds of the present invention. Suitable examples include zinc oxide, calcium carbonate, magnesium silicate (Talc), calcium sulfate, barium sulfate, zinc borate, anhydrous sodium potassium alumino silicate, calcium sulfate, calcium carbonate and their mixtures. A commercially available filler is Duramite® from ECC International (Atlanta, Ga.). The fillers may be present in a range from about 10.0% by weight to about 50.0% by weight, and preferably from about 20.0% by weight to about 40.0% by weight, based on the total composition solids. The fillers can be used to provide texture, control gloss and increase the coatings volume to enhance its economics.

If desired, texturizers can be used in the powder-based compositions and include polytetrafluoroethylene, rubber, glass grit, talc and their mixtures. A commercially available texturizer includes Shamrock SST-3 from Shamrock Technologies (Newark, N.J.). The texturizer may be present in a range from about 1.0% by weight to about 10.0% by weight, and preferably from about 2.0% by weight to about 7.0% by weight, based on the total composition solids.

Coloring agents can be used in the powder-based compositions and any heat stable coloring agent may be used. The preferred coloring agents are carbon black and black mixed metal oxides. Commercially available coloring agents include Black No. 101 from the Shepard Color Company (Cincinnati, Ohio), and Special Black 100 from Degussa AG (Frankfurt, Germany). The coloring agent may be present in a range from about 1.0% by weight to about 25.0% by weight, and preferably from about 5.0% by weight to about 15.0% by weight, based on the total composition solids.

Plasticizers may be used in the present invention to provide flexibility. Plasticizers may include polymeric resins, elastomers, waxes, oils and their mixtures. The plasticizers may be present in a range from about 1.0% by weight to about 15.0% by weight, and preferably from about 5.0% by weight to about 10.0% by weight, based on the total composition solids.

Surfactants can be used and may include inorganic polyphosphates, organic polyacids, nonionic block copolymers and their mixtures. The surfactants may be present in a range from about 0.5% by weight to about 3.0% by weight, and preferably from about 1.0% by weight to about 2.0% by weight, based on the total composition solids. The surfactants are useful as dispersing agents for the inorganic compounds and inorganic fillers.

Fluidizing agents can be used to improve the dry-flow characteristics of the powder-based compositions. Examples include fumed silica, alumina oxides and their mixtures. The fluidizing agent can be present in a range from about 0.05% by weight to about 1.0% by weight, and preferably from about 0.1% by weight to about 0.5% by weight, based on the total composition solids.

In the inventive method, for the preparation of heat resistant protective coatings, the powder-based materials are combined and agitated to form a dry blend. The blend is melt mixed in an extruder, at a temperature less than about 130° C., and cooled to form solid particulate. Fluidizing agents may be added at this stage of the process to enhance the materials dry-flow characteristics. Preferably, the particulate is ground at a temperature less than about 20° C. Lower temperatures reduce melt coagulation and enhance the grinding process. The powder-based compositions can have an average particle size in a range from about 0.1 microns to about 500 microns and preferably from about 30 microns to about 200 microns. Said compositions may be applied on a substrate through electrostatically spraying or with a fluidized bed method. The coated substrate is then heated to a temperature in a range from about 200° C. to about 250° C., and preferably from about 210° C to about 240° C., and more preferably from about 210° C. to about 225° C. It is generally known that elevated temperatures can accelerate a materials reactivity. For example, a reference describing the frequency of bond formation is described in "Organic Chemistry", T. W. Graham Solomons, second edition, pages 139–141. Briefly, the collision theory of reaction rates describes how the rates of chemical reactions are directly proportional to the collision frequency. In the present invention, it is surmised elevated temperatures increase the frequency and extent of addition and/or condensation reactions to form a crosslinked polymer matrix.

The protective coatings can have a film thickness in a range from about 25 microns to about 255 microns, and preferably from about 100 microns to about 200 microns. A higher-film-build can enhance the coating process and increase the protective coatings film thickness to provide an extra barrier of protection. For example, during manual and automated spraying applications it is often necessary to deposit a high-film-build to assure a complete deposition of the particles on the substrate. Additionally, a protective coating comprising a film thickness greater than about 100 microns is preferred in that such a high-film-build can enhance the coatings resistance to abrasion and environmental corrosives.

The protective coatings provide excellent heat resistant properties and are particularly useful on articles which are subjected to elevated temperatures including stacks, mufflers, manifolds, boilers, ovens furnaces, steam lines, heat exchangers, barbecue equipment and cooking utensils.

The present invention is further illustrated, but not limited to, the following examples.

EXAMPLES

The following test methods were used:
Tape Pull Test Method (TPTM)

Aluminum cast coupons were electrostatically sprayed with powder-based compositions and heated in an electric oven for 13 minutes at 218° C. The samples were subjected to a temperature between 340° C.–399° C. and tested at about 40 hours and at about 500 hours. After heating, the samples were cooled to ambient room temperature and aged for at least one hour. The samples were then covered with a piece of Scotch® Brand "8919" tape from 3M Company (St. Paul, Minn.) and firmly applied using hand pressure. The tape was quickly removed, using a 90° peel mode, and visually inspected for signs of coating failure. The protective coating passes the TPTM when said coating is not transferred to the tape.

Outgassing Test Method (OTM)

The OTM is used to determine the maximum film thickness at which a powder-based composition can be applied and cured without showing coating defects from escaping gases. A 10.16 cm×30.48 cm steel panel was coated with a powder-based composition wherein the coating thickness was gradually increased from about 25 microns to about 255 microns. The panel was heated to a temperature of about 220° C. for 13 minutes and visually inspected for defects. The protective coating passes the OTM, through visual examination, when said coating is free of defects including pinholes, cracks and craters.

Example 1

Example 1 describes powder-based compositions, using various inorganic materials, which have been cured and evaluated using the tape pull test method (TPTM).

| Base formulation: | |
| --- | --- |
| Dow Corning ® 1-0543 | 70.0 grams |
| Fine-Clad ™ A-244-A | 30.0 grams |
| Resiflow P-67 ™ | 1.5 grams |
| Uraflow B | 1.0 grams |
| Black 101 | 20.0 grams |

| Inorganic materials described below: | | |
| --- | --- | --- |
| PIGMENT | GRAMS | TPTM (340° C.) |
| Hydrated Silicates of Aluminum/Calcium Carbonate | 53/53 | Pass >500 hours |

| | -continued | |
|---|---|---|
| Calcium Metasilicate | 75 | Pass >500 hours |
| Calcium Metasilicate/Hydrated Silicates of Aluminum | 40/40 | Pass >500 hours |
| Zinc Oxide | 50 | Failed <40 hours |
| Zinc Oxide | 70 | Failed <40 hours |
| Zinc Oxide | 90 | Failed <40 hours |
| Anhydrous Sodium Potassium Alumino Silicate | 70 | Failed <40 hours |
| Anhydrous Sodium Potassium Alumino Silicate | 90 | Failed <40 hours |
| Barium Sulfate | 50 | Failed <40 hours |
| Barium Sulfate | 70 | Failed <40 hours |
| Barium Sulfate | 90 | Failed <40 hours |
| Zinc Borate | 50 | Failed <40 hours |
| Zinc Borate | 70 | Failed <40 hours |
| Zinc Borate | 90 | Failed <40 hours |
| Magnesium Silicate | 50 | Failed <40 hours |
| Magnesium Silicate | 70 | Failed <40 hours |
| Magnesium Silicate | 90 | Failed <40 hours |
| Calcium Sulfate | 50 | Failed <40 hours |
| Calcium Sulfate | 70 | Failed <40 hours |
| Calcium Sulfate | 90 | Failed <40 hours |
| Calcium Carbonate | 50 | Failed <40 hours |
| Calcium Carbonate | 70 | Failed <40 hours |
| Calcium Carbonate | 90 | Failed <40 hours |

The data shows the presence of hydrated silicate of aluminum and/or calcium metasilicate significantly increase the protective coatings heat resistant properties, compared to other inorganic pigments, showing the utility of the invention.

Example 2

Example 2 compares the heat resistance and outgassing properties of the inventive coating (IF-6531) from H. B. Fuller Company (St. Paul, Minn.) with two commercially available coatings from Morton (Reading, Pa.) and O'Brien (Houston, Tex.).

| TEST | MORTON (99-7003) | O'BRIEN (SFB-601-H1) | H. B. FULLER (IF-6531) |
|---|---|---|---|
| TPTM - Failure at 340° C. | <60 hours | <20 hours | >500 hours |
| Outgassing | 76.0 Microns | 89 Microns | 203 Microns |

The data demonstrates that the inventive coating has higher heat resistance compared to the commercially available coatings. Additionally, the inventive coating can be utilized at a film thickness greater than 100 microns, without the appearance of coating defects, showing the utility of the invention.

We claim:

1. A protective coating formed from a powder-based composition comprising:
   a) at least one glycidyl-functional polyacrylic polymer;
   b) at least one hydroxyl-functional polysiloxane;
   c) at least one inorganic compound selected from the group consisting of calcium metasilicate, hydrated silicates of aluminum and mixtures thereof; and
   d) at least one flow-control agent.

2. The protective coating as described in claim 1 wherein a continuous film is formed by heating said composition to a temperature in the range of from about 205° C. to about 240° C.

3. The protective coating as described in claim 1, wherein said coating is characterized as having a film thickness in a range of from about 100 microns to about 200 microns.

4. The protective coating as described in claim 1, wherein said polyacrylic polymer is present in the powder-based composition in a range from about 10.0% by weight to about 20.0% by weight.

5. The protective coating as described in claim 1, wherein said hydroxyl-functional polysiloxane is present in the powder-based composition in a range from about 25.0% by weight to about 45.0% by weight.

6. The protective coating as described in claim 1, wherein said inorganic compound is present in the powder-based composition in a range from about 20.0% by weight to about 40.0% by weight.

7. The protective coating as described in claim 1, wherein the flow-control agent is present in the powder-based composition in a range from about 0.5% by weight to about 1.5% by weight.

8. The protective coating as described in claim 1, wherein said coating is substantially free of coating defects and passes the tape pull test method after about 500 hours at 340° C.

9. An article comprising a substrate coated with a protective coating, on at least one surface of the substrate, comprising the reaction product of:
   a) at least one glycidyl-functional polyacrylic polymer;
   b) at least one hydroxyl-functional polysiloxane;
   c) at least one inorganic compound selected from the group consisting of calcium metasilicate, hydrated silicates of aluminum and mixtures thereof; and
   d) at least one flow-control agent.

10. The article as described in claim 9, wherein said coating is substantially free of coating defects and passes the tape pull adhesion method after about 500 hours at 340° C.

11. A method for the preparation of a protective coating comprising the steps of:
   a) providing a dry blend of powder-based material comprising;
      i) at least one glycidyl-functional polyacrylic polymer;
      ii) at least one hydroxyl-functional polysiloxane;
      iii) at least one inorganic compound selected from the group consisting of calcium metasilicate, hydrated silicates of aluminum and mixtures thereof; and
      iv) at least one flow-control agent;
   b) melt mixing said blend and cooling to form a solid particulate;
   c) grinding said particulate to form a powder-based composition having an average particle size of less than about 150 microns; and
   d) coating said composition onto a substrate and heating to a temperature greater than about 205° C.

12. The method as described in claim 11, wherein said materials are dry blended at ambient room temperatures.

13. The method as described in claim 11, wherein the melt mixing process is accomplished at a temperature less than about 130° C.

14. The method as described in claim 11, wherein the grinding process is accomplished at a temperature less than about 20° C.

15. The method as described in claim 11, wherein said composition is coated onto a substrate by electrostatically spraying.

16. The method as described in claim 11, wherein said protective coating is characterized as having a film thickness greater than about 100 microns.

* * * * *